Jan. 3, 1933.      S. R. BERGMAN      1,893,354
ARC WELDING SYSTEM
Filed Feb. 7, 1931
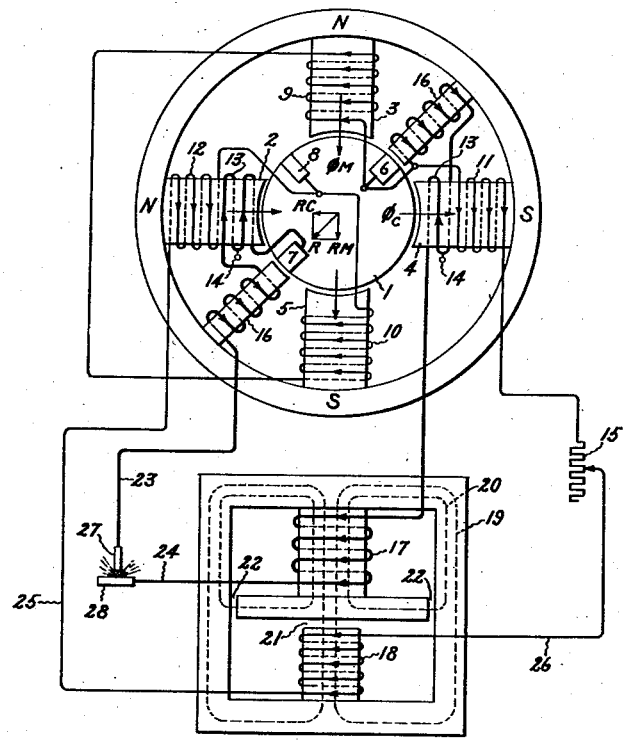
Inventor:
Sven R. Bergman,
by Charles E. Mullan
His Attorney Patented Jan. 3, 1933

1,893,354

UNITED STATES PATENT OFFICE

SVEN R. BERGMAN, OF NAHANT, MASSACHUSETTS, ASSIGNOR TO GENERAL ELECTRIC COMPANY, A CORPORATION OF NEW YORK

ARC WELDING SYSTEM

Application filed February 7, 1931. Serial No. 514,200.

My invention relates to electrical systems in which the load is continuously varying. Due to the rapid changes of flux in the armature or in the series field of a generator supplying a fluctuating load, voltages are induced in the main exciting windings of the generator which render it sluggish in operation.

It is an object of my invention to provide an improved magnetic coupling external to a generator between the load and field circuits of the generator which is opposite in effect to that between the circuits within the generator to overcome this sluggish operation of the generator and produce a system in which the regulation under fluctuating load conditions is the same as under steady load conditions.

My invention is particularly applicable to arc welding systems in which variable voltage generators are employed for supplying the welding current. During welding the load current is never constant because the circuit is frequently short-circuited at the arc by small globules of metal and because the electrode is not always fed at exactly the proper rate, particularly in hand-welding. Under such conditions transient currents and potentials appear in the generator and the regulation of the generator deviates from the regulation of the generator under steady load conditions. In striking an arc the current overshoots its steady value and in breaking the arc a certain time interval is required for the voltage to return to its normal open circuit value.

It is desirable that the short-circuit current should not be excessive and it is also desirable to have the voltage of the generator built up rapidly. By connecting a transformer-reactor according to my invention with the usual welding generator heretofore employed these desired welding characteristics may be obtained. The transformer-reactor furnishes a coupling external to the generator between the arc circuit and the field circuit of the generator which is opposite in effect to that between the two circuits within the generator and by reason of this connection the undesirable transients set up in the generator are neutralized. The reactance of the transformer-reactor also furnishes the necessary amount of series stabilizing reactance heretofore used with such generators. Thus by associating with a variable voltage generator a reactor-transformer of the construction about to be described, a system is produced by means of which both hand and automatic arc welding may be accomplished with great ease and by means of which weld metal may be deposited with ease and accuracy under all conditions met in welding to produce welds of uniformity and strength.

My invention will be better understood from the following description taken in connection with the accompanying drawing and its scope will be pointed out in the appended claims.

The accompanying drawing diagrammatically illustrates a welding system according to my invention.

The variable voltage generator shown in the figure is of the type disclosed in my Letters Patent 1,340,004, granted May 11, 1920. The principle involved in this generator is that of a dual magnetic circuit. The armature 1 is wound for two poles and the field contains four main poles 2, 3, 4, and 5. In general the armature should be wound for half the number of poles contained in the field. In this machine the poles are paired in groups of the same polarity as indicated in the drawing. Thus there is a group of two north poles 2 and 3 followed by a group of two south poles 4 and 5.

In order to establish a working theory of the operation of this machine the flux distribution is assumed to be as indicated in the drawing. As shown there exists two fluxes $\phi_m$ and $\phi_c$, displaced 90 electrical degrees from each other. The flux $\phi_m$ will be designated as the main flux and the flux $\phi_c$ as the cross flux.

The load current of the armature 1 is taken from two main brushes 6 and 7 placed in neutrals located between poles of opposite polarity. In addition to these brushes there is an exciting brush 8. The machine is self-excited, the excitation for the field windings 9, 10, 11, and 12 being taken from brushes 6, 8 as shown in the drawing. The main magnetic circuit carrying the main flux $\phi_m$ is so designed that magnetic saturation exists, whereas the cross magnetic circuit carrying the cross flux $\phi_c$ is designed without saturation. As soon as the armature is loaded there is set up in it a reaction R which may be resolved into two components, one RM in the direction of the main flux and the other RC in opposition to the cross flux. Since the main magnetic circuit is saturated, the component RM can not force any more flux through this circuit and the main flux remains practically constant. The component RC, however, neutralizes the cross flux $\phi_c$ which thus decreases as the load increases.

The voltage of the machine across the brushes 6, 7 is the algebraic sum of the voltage between the brushes 6, 8 and 8, 7. The voltage 6, 8 is induced by the main flux $\phi_m$ and remains practically constant since the main flux is constant and the speed of the machine is constant. The voltage 8, 7, however, decreases with the load since the cross flux decreases as described. As a matter of fact the cross flux passes through zero and is finally reversed.

If it is desired to weld with smaller currents a series winding 13 is placed on the cross poles 2, 4 which is wound in such a direction as to support the armature reaction. Since it is desirable to obtain a large number of different welding currents the series winding is provided with taps 14. To secure close adjustment of the welding current a field rheostat 15 is inserted in the cross field circuit. To obtain good commutation, commutating poles 16 are also provided.

External to the generator I provide a magnetic coupling between the armature and field circuits of the generator opposite in effect to that between the circuits within the generator. This coupling is obtained through a reactor-transformer having primary and secondary windings 17 and 18. These windings are located on a magnetic core structure which links the primary and secondary windings and which also provides a leakage path about the primary winding 17. The core structure provided furnishes two magnetic circuits 19, 20, with air gaps 21, 22, in each circuit. One magnetic circuit 19 links the primary and secondary windings 17 and 18 and the other magnetic circuit establishes a leakage path about the primary winding 17. This leakage path is provided in order to increase the reactance of the winding 17 and enables this winding to act as a stabilizing reactance such as has heretofore been employed in welding circuits for stabilizing the arc.

The primary winding 17 is connected in series with the load circuit 23, 24 to the load brushes 6, 7 of the generator. The secondary winding 18 is connected through conductors 25, 26 and resistance 15 in series with the cross field windings 11, 12 of the generator.

As shown in the drawing, the series and shunt windings 17, 18, of the transformer-reactor are wound in such a direction that the direct current flowing in these windings magnetized the core structure in the same direction. The magnetizing force of these windings is very large. For example, in a device built for a 300 ampere welding generator, the number of series turns in the winding 17 is 35, which at 300 amperes gives 10500 ampere turns. The number of turns in the shunt winding 18 is 600 and the current 7 amperes, representing 4200 ampere turns. Thus there are 14700 ampere turns magnetizing the central part of the core structure. Without the air gap 21 this large magnetizing force would completely saturate the transformer and there would be no transformer action or change of magnetic flux in the transformer-reactor due to this heavy saturation. In the 300 ampere device the gap in the main magnetic circuit is comparatively large, being about $\frac{1}{2}''$, in order to prevent saturation of the whole transformer. It is also necessary to provide an air gap in the leakage magnetic circuit about the winding 17. In a 300 ampere device this gap is about $\frac{1}{2}''$. Thus it will be noted that these air gaps 21, 22, in a device of the character described are comparatively large. It is necesary that these gaps be comparatively large in order to prevent saturation in either of the two magnetic circuits. The relative length of the air gaps, however, may vary and are not necessarily equal as in the example given above.

In the system illustrated the generator and transformer-reactor have been shown supplying a welding arc established between an electrode 27 and a work piece 28 which constitutes a cooperating electrode. These units may however be connected to any power consuming device which during its operation imposes widely fluctuating loads upon the generator. The arrangement proposed is not limited to its utility to welding systems but is applicable to any load system in which the power demand fluctuates widely and in which it is desired to have the generator regulate as on a constant load. It is thus apparent that while I have provided a system which is especially adapted for arc welding, certain features thereof are capable of use in other relations and I desire to cover all such modifications and variations thereof which fall within the scope of my invention as set forth in the appended claims.

What I claim as new and desire to secure by Letters Patent of the United States, is:

1. A generator and a magnetic coupling external to said generator between the armature and field circuits of said generator opposite in effect to that between said circuits within said generator, said coupling comprising a primary winding connected in series with the armature circuit of said generator, a secondary winding connected in series with the field circuit of said generator and a magnetic core structure for said windings having two magnetic circuits with air gaps in each magnetic circuit, one magnetic circuit being common to both of said primary and secondary windings and carrying the main flux of said windings and the other magnetic circuit being associated with the primary winding for establishing a leakage flux path about said winding.

2. A generator, a transformer-reactor having primary and secondary windings arranged on a magnetic core structure having two magnetic circuits with air gaps in each magnetic circuit, one of which magnetic circuits is common to both of said windings and the other of which magnetic circuits establishes a leakage flux path about said primary winding, a load circuit, means for connecting said load circuit to said generator through the primary winding of said reactor-transformer, and means for connecting the secondary winding of said reactor-transformer in series with the field of said generator for establishing a flux in the magnetic circuit common to the primary and secondary winding of said reactor-transformer in the same direction as the flux established by the flow of load current in the primary winding of said reactor transformer.

3. A generator, a reactor-transformer having primary and secondary windings, a magnetic core structure for said windings having two magnetic circuits with an air gap in each circuit, one circuit being common to both said primary and secondary windings and carrying the main flux of said windings and the other circuit linking only said primary winding for establishing a leakage flux path about said winding, a load circuit, means for connecting said load circuit to said generator through the primary of said transformer-reactor and means for connecting the field of said generator to the secondary winding of said reactor-transformer for magnetizing said magnetic core structure linking said primary and secondary windings in the same direction as the primary winding of said reactor-transformer.

4. A continuous current dynamo electric generator having a shunt field winding and a differential compound winding, a magnetic coupling external to said generator between the load and the shunt field circuits of said generator opposite in effect to that between said circuits within said generator, said coupling comprising a primary winding connected in series with the armature and series field winding of said generator, a secondary winding connected in series with the shunt field winding of said generator and a magnetic core structure for said windings having two magnetic circuits with air gaps in each circuit, one circuit being common to both said primary and secondary windings and carrying the main flux of said windings and the other circuit linking the primary winding for establishing a leakage flux path about said winding.

5. In combination with a dynamo electric machine, a transformer-reactor and a load circuit, said dynamo electric machine having an armature provided with a commutator, load brushes and an auxiliary brush bearing on said commutator, a field magnet structure having two sets of field poles, one of said sets of poles being saturated so that the flux in said set is unaffected by armature reaction and produces a constant voltage between said auxiliary brush and one of said load brushes, the other of said sets of poles being unsaturated so that the flux therein is varied by the armature reaction so that the voltage produced between the load brushes decreases when the load current increases, the voltage between said load brushes being equal to the algebraic sum of the voltages between said auxiliary brush and each of said load brushes, field windings on said unsaturated field poles connected between said auxiliary brush and one of said load brushes and arranged to set up a constant flux in said poles in an opposite direction to the flux produced in said poles by armature reaction and said reactor-transformer having primary and secondary windings, a magnetic core structure having an air gap therein linking said primary and secondary windings and a magnetic core structure provided with an air gap linking said primary winding, means for connecting said load circuit to the armature of said generator through the primary of said transformer-reactor and means for connecting the field winding on the unsaturated field poles of said generator to the secondary winding of said reactor transformer for magnetizing said magnetic core structure linking said primary and secondary windings in the same direction as the primary winding of said reactor-transformer.

In witness whereof I have hereunto set my hand.

SVEN R. BERGMAN.